Figure 1:
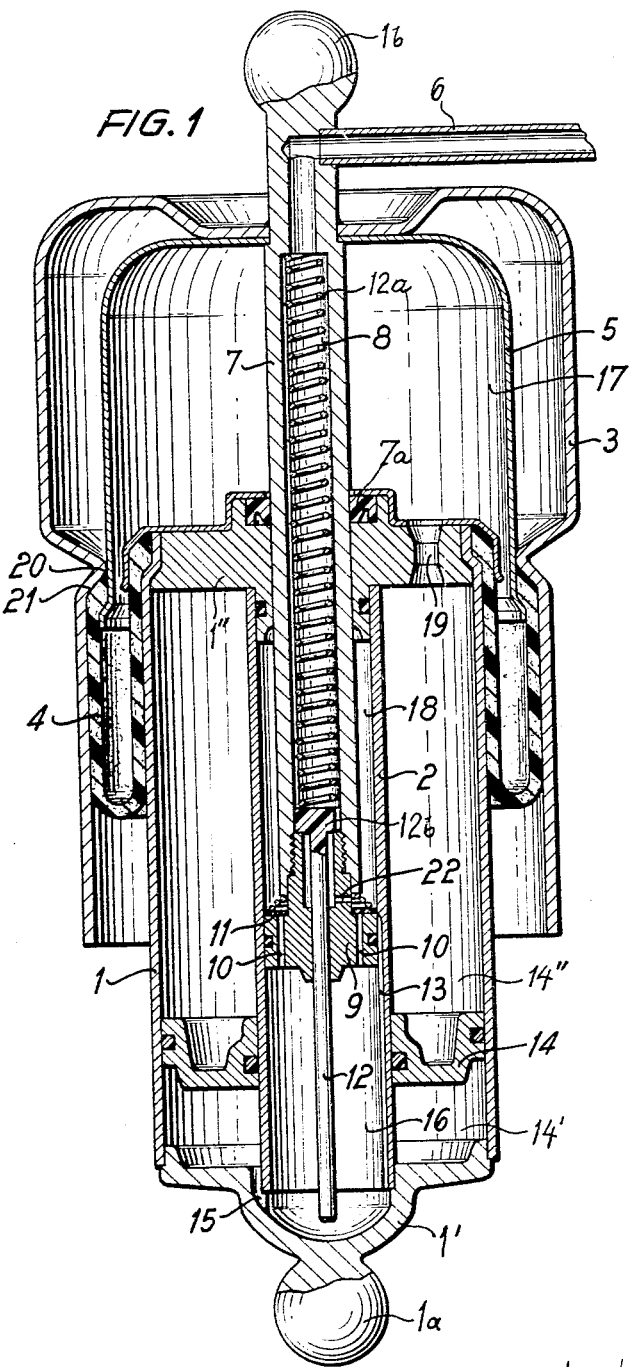

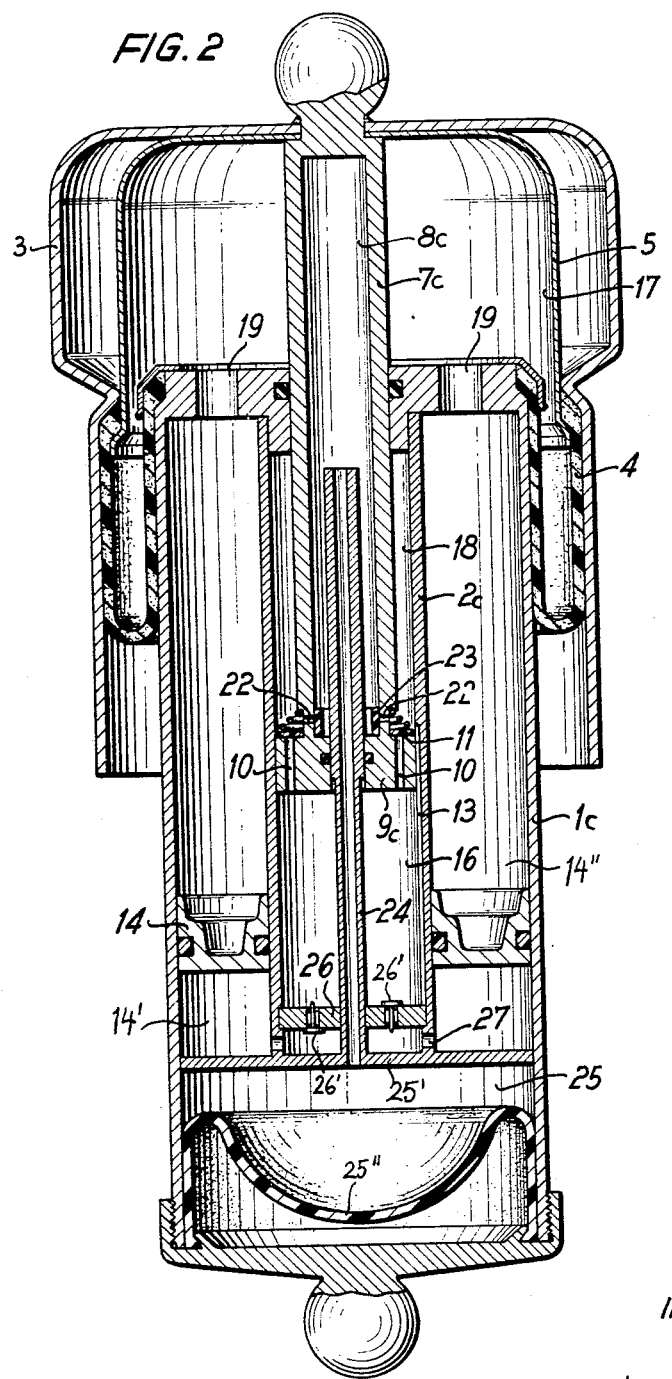

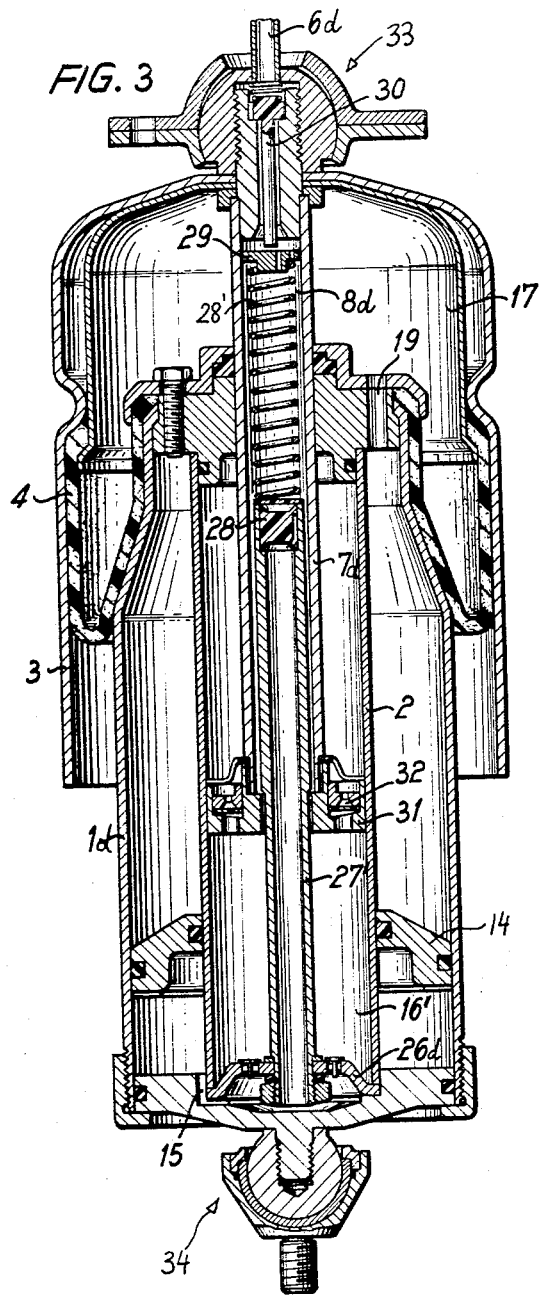

United States Patent Office 3,391,922
Patented July 9, 1968

3,391,922
HYDROPNEUMATIC SUSPENSION ELEMENT
Ludwig Axthammer, Schweinfurt, Germany, assignor to Fichtel & Sachs A.G., Schweinfurt, Germany
Filed Nov. 22, 1966, Ser. No. 596,184
Claims priority, application Germany, Dec. 17, 1965, F 47,946
9 Claims. (Cl. 267—64)

This invention relates to hydropneumatic suspension elements, and particularly to suspension elements which may be employed in a vehicle, such as an automobile, for simultaneously performing the functions of conventional mechanical springs, shock absorbers, and leveling devices.

The conventional hydropneumatic suspension elements now in commercial use include a cylinder member and a piston assembly including a piston rod which moves axially into and out of an opening in a radial end wall of the cylinder member. Attachments on the opposite ends of the cylinder member and the piston rod are provided for interposing the element between the sprung and unsprung masses of a vehicle. The known elements may vary in the arrangement of internal parts within the cylinder member and the piston assembly, but these differences are not of primary relevance to this discussion.

It is a common feature of the known devices that they require a mounting space not readily available under many conditions. When the piston rod is fully expelled from the cylinder member, the effective bulk of the device is determined by the cross section of the cylinder member and the combined length of the cylinder member and of the projecting piston rod portion. Although the piston rod is much slimmer than the cylinder member, an annular space axially coextensive with the projecting piston rod portion and extending about the same cannot be utilized for other purposes.

One object of the present invention is the provision of a hydropneumatic suspension element which is of very compact construction, and in which the mounting space required for the element is fully occupied by the working parts of the element.

It is another common feature of commercial hydropneumatic suspension elements used heretofore that the piston rod moves inward and outward of the cylinder member through a packing which is interposed between a fluid at high pressure within the cylinder member and the ambient atmosphere. The useful life of the known elements is normally determined by the period during which their packings can maintain a tight seal under unfavorable operating conditions of frictional wear and a substantial, continuously applied, pressure differential.

Another object of the invention is the provision of a suspension element which avoids the application of a significant pressure differential to a piston rod packing or its equivalent under most operating conditions. A concomitant object is the avoidance of a piston rod packing which is exposed to the ambient atmosphere.

It has been proposed heretofore to connect a piston rod to the cylinder member by means of bellows to avoid the need for a piston rod packing, but bellows capable of the extension needed in suspension elements further increase the bulk of the structure, and they significantly increase the cost of the element if they are to meet the reliability requirements of the automotive industry.

It is a further object of the invention to provide a suspension element of the type described which is relatively inexpensive and quite simple in structure, and therefore rugged and reliable.

With these and other objects in view, as will hereinafter become apparent, the suspension elements of the invention are characterized by the use of a cup-shaped vessel and of an outer cylinder member which is partly received in the vessel for axial telescoping movement inward and outward of the chamber defined by the vessel. The chamber is substantially closed in an axial direction by the cylinder member and by a diaphragm of flexible material which is interposed between the vessel and the cylinder member. A divider which is movably mounted in the cylinder member in sealing engagement with the same separates two spaces in the cylinder member from each other. A first one of these spaces communicates with the chamber in the afore-mentioned vessel.

A piston assembly is fixedly fastened to the vessel and extends from the vessel inward of the cylinder member into an inner cylinder within the cylinder member. A portion of the piston assembly is received in the inner cylinder for axial movement therein when the vessel and the outer cylinder member move relative to each other. The portion of the piston assembly in the inner cylinder bounds a portion of the latter which is connected with the second one of the afore-mentioned two spaces.

When the element is in operating condition, a continuous body of one fluid, such as air, nitrogen, or another gas, substantially fills the chamber in the vessel and the communicating first space. A continuous second body of a fluid, typically oil, hydraulic brake or transmission fluid, or another liquid, fills the second space, the afore-mentioned portion of the inner cylinder, and the conduits which connect them.

The exact nature of this invention as well as other objects and advantages of the same will be readily apparent from consideration of the following specification relating to the annexed drawing in which:

FIGURES 1 to 3 respectively illustrate hydropneumatic suspension elements of the invention in elevational section on their axes.

Referring now to the drawing in detail, and initially to FIGURE 1, there is seen a hydropneumatic suspension element of the invention whose outer shell is formed mainly by a cylinder 1 and a coaxial cup-shaped vessel 3 of heavy sheet metal in the open bottom end of which the cylinder 1 is received for telescoping movement. The exposed bottom wall 1' of the cylinder 1 is provided with a conventional attachment 1a for securing the cylinder 1 to the wheels of a vehicle. The concealed top wall 1'' of the cylinder 1 has a central opening axially aligned with a tubular inner cylinder 2 which extends between the end walls 1', 1''.

A tubular diaphragm 4 of fiber-reinforced rubber is folded into an annular body which is U-shaped in axial section. The legs of the U-shape are formed by two cylindrical portions of the diaphragm which are integrally connected by the bight portion of the U-shape. One circular rim of the diaphragm 4 is attached to the circumference of the cover 1''. The other rim is clamped against a conical surface 21 of an internal circular rib 20 of the cup-shaped vessel 3 by a resilient liner 5 which is bell-shaped and coaxially contained within the vessel 3.

The central portions of the vessel 3 and of the liner 5 are fixedly fastened to a tubular piston rod 7 which partly projects upward from the vessel 3 along the common axis of the vessel and of the cylinders 1 and 2. The projecting top portion of the piston rod 7 is connected to a pressure hose 6 and carries an attachment 1b by means of which the rod 7 may be attached to the body of a vehicle.

The axial bore 8 of the piston rod 7 is bounded at the lower or inner end of the rod by a partly hollow piston 9 which is threadedly fastened to the rod 7 and is slidably sealed to the inner wall of the cylinder 2. The piston rod 7 is slidably sealed to the top wall 1'' by an annular packing 7a of approximately V-shaped cross section, the V-shape being open in an axial direction toward a pumping compartment 18. Axial passages 10 may connect the pumping compartment 18 in the cavity of the cylinder 2 about the piston rod 7 with a pressure compartment 16 below the piston 9 when the passages 10 are opened by a spring-biased check valve 11. The valve 11 opens when the pressure in the compartment 16 exceeds that in the compartment sufficiently to overcome the biasing spring of the valve.

A valve rod 12 extends axially through almost the entire bore 8, a conforming central bore of the piston 9, and downward into the compartment 16. A helical compression spring 12a in the bore 8 normally holds an annular valve body 12b fixedly mounted on the rod 12 against an annular shoulder of the piston 9, and thereby blocks communication between the bore 8 and an interior space of the piston 9 which is connected with the compartment 18 by a radial bore 22 in the piston.

The annular space radially contained between the cylinders 1, 2 and axially bounded by the walls 1', 1" is axially divided by a floating annular divider or piston 14. The space portion 14' under the piston 14 is connected with the compartment 16 by a duct 15 provided in the bottom wall 1'. The space portion 14" above the piston 14 is connected by an axial duct 19 in the top wall 1" with a normally gas-filled chamber 17 under the vessel 3. When the piston rod 7 moves inward of the cylinder 2 from the position illustrated in FIGURE 1, an axial groove 13 in the inner wall of the cylinder 1 bypasses the piston 9 and connects the pumping compartment 18 with the pressure compartment 16.

The hose 6, bore 8, compartments 16, 18, space portion 14', and the connecting passages are normally filled with a liquid whereas a gas under a pressure higher than that of the atmosphere fills the chamber 17, the space portion 14", and the duct 19.

The aforesaid apparatus operates as follows:

If the pressure applied to the attachments 1a, 1b and urging the piston rod 7 inward of the cylinder 2 is increased moderately, the piston rod 7 and piston 9 move downward. A portion of the liquid displaced from the compartment 16 flows into the compartment 18 through the groove 13 or the passages 10 or both, but the bulk of the displaced liquid lifts the piston 14 and compresses the gas in the space portion 14" and in the chamber 17, which is also being compressed by the descending vessel 3. During the resilient rebound of the suspension element, the rod 7 is driven outward by liquid displaced by the compressed gas from the space portion 14". The unit operates as a spring.

If the increase in pressure applied to the attachments 1a, 1b is severe, the valve rod 12 abuts against the bottom wall 1', and the valve member 12b is lifted from its seat. A path is thereby opened from the pressure hose 6 to the compartment 16 by way of the axial bore 8 in the rod 7, the radial bore 22 in the piston 9, and the groove 13. It will be understood that the hose 6 is connected to an external storage vessel in which pressure fluid is stored under a pressure greater than the operating pressure in the compartment 16 under all normal circumstances. The pressure may be provided in a known manner by a body of compressed gas in the non-illustrated storage vessel, by a spring loaded plunger or piston, or in any other conventional manner. Additional liquid is supplied from the storage vessel as long as the valve 12b is open. When the valve rod 12 is lifted from the bottom wall 1" by the entry of sufficient liquid into the compartment 16, the valve 12b returns to the illustrated position, and the suspension element returns to its normal operation as a spring.

The spring characteristics of the element, however, are modified by the additional liquid admitted to the chamber 16 which maintains a higher average pressure in the gas within the space 14" and the chamber 17.

When the excessive load on the element is subsequently relieved, as by partly unloading the vehicle, the expanding gas drives liquid into the compartment 16 to raise the piston 9 above the illustrated position, thereby increasing the pressure in the pumping compartment 18 until the valve 12b is lifted from its seat by the liquid pressure against the restraint of the spring 12a, and some liquid is returned through the hose 6 to the non-illustrated storage vessel.

Upon resilient rebound of the piston 9 downward toward the illustrated position, the valve 11 is opened to admit additional liquid from the compartment 16 into the compartment 18, and a new pumping cycle is started on the next outward movement of the piston 9. Pumping continues until the illustrated position is restored in which inward movement of the piston 9 opens the groove 13.

The illustrated suspension element thus is self-levelling, and tends automatically to restore the attachments 1a, 1b to a condition of oscillation about the illustrated position during normal vehicle operation regardless of the applied load as with a mechanical spring.

Under conditions of spring operation, the pumping compartment 18 communicates with the pressure compartment 16 through the groove 13, and the fluid pressure in the compartment 18 is not significantly different from that in the chamber 17. The packing 7a merely acts as a wiper which prevents entry of liquid into the chamber 17. A significant pressure differential across the packing 7a is established only while liquid is being pumped back into the non-illustrated storage vessel through the hose 6. The higher pressure in the pumping compartment 18 is applied to the inner surface of the packing 7a and tends to press the packing firmly against the confining surfaces of the wall 1" and of the rod 7. The packing 7a performs its function as a pressure seal only during a very small fraction of the operating time of the suspension element, and the useful life of a packing 7a of suitable material is very long. The packings which seal the floating piston 14 to the cylinders 1, 2 are never subjected to major pressure differences.

The greatest pressure differential in the illustrated apparatus prevails across the heavy, folded diaphragm 4 which is held at all times in the illustrated expanded condition by the gas pressure in the chamber 17. As the piston rod 7 moves inward and outward of the cylinder 2, and the cup-shaped vessel 3 moves axially relative to the outer cylinder 1 with the rod 7, the position of the bight in the diaphragm 4 shifts. The major portions of the diaphragm are supported by the opposite faces of the cylinder 1 and the vessel 3, and the diaphragm lasts normally for the useful life of the suspension element.

The modified suspension element shown in FIGURE 2 has an outer shell constituted by a cup-shaped vessel 3, a diaphragm 4, and an outer cylinder 1c. The cylinder differs from the corresponding structure shown in FIGURE 1 mainly by a centrally apertured radial partition 25' which defines a storage chamber 25 in the lower end of the cylinder cavity. The storage chamber is further divided by a flexible membrane 25", the space under the membrane being occupied by a gas under suitable high pressure.

The liquid-filled upper portion of the chamber 25 communicates with the axial bore 8c in a piston rod 7c through the aperture in the partition 25' and an axial tube 24 fixedly fastened to the partition 25'. The upper axial half of the tube 24 has an outer diameter matching the inner diameter of a central bore in a piston 9c. The piston slides axially in an inner cylinder 2c which extends between the top wall of the cylinder 1c and the partition 25'.

Radial bores 27 in the cylinder 2c closely adjacent the partition 25' connect the bottom part of the cylinder 2c with the annular space 14' under a floating annular piston 14 which slidably connects the cylinders 1c, 2c. An apertured damping plate 26 separates the bottom of the cylinder 2c from a pressure compartment 16 subjacent the piston 9c. A central opening in the plate 26 is sealed by the fixedly received lower half of the tube 24 whose diameter is smaller than that of the afore-mentioned upper half. Throttling apertures in the plate 26 are provided with check valves 26' which permit axial liquid flow in an upward and downward direction respectively.

Bores 10 in the piston 9c connect the pressure compartment 16 with a pumping compartment 18 above the piston 9c about the piston rod 7c which is integral with the piston 9c. The bores 10 are normally closed by a spring biased check-valve 11 as described with reference to FIGURE 1. The radial bores 22 in the integral piston assembly 9c, 7c are normally closed by an annular resilient member 23 in the axial bore 8c which opens the bores 22 when the fluid pressure in the compartment 18 exceeds that in the bore 8c by an amount determined by the characteristics of the member 23.

Other structural features of the modified suspension element shown in FIGURE 1 are substantially identical with corresponding features of the first-described element. They have been provided with the same reference numerals as in FIGURE 1 and do not require further description.

The device of FIGURE 2 operates in the following manner:

When the element functions as a spring, the piston 9c, the vessel 3, and associated members oscillate about the illustrated position, thereby alternatingly expanding and compressing the gas cushion in the chamber 17 and in the space 14''. The central opening in the piston 9c is sealed by the upper portion of the tube 24 during the oscillating movement, but liquid may flow through an axial groove 13 in the inner face of the cylinder 2c as described above.

If the load of the suspended vehicle body is increased, an annular passage is formed between the descending piston 9c and the lower part of the tube 24 and connects the pressure compartment 16 with the bore 8c in the piston rod 7c and with the storage chamber 25. Additional liquid is forced into the compartment 16 under the pressure of the gas under the membrane 25'' until the illustrated position of the piston 9c is restored, and spring action can be resumed. The vehicle body is thereby lifted to its normal level. The gas pressure in the space 14'' and in the chamber 17 assumes a higher average value corresponding to the greater load.

If the load of the vehicle is reduced, the piston 9c is driven outward of the cylinder 2c by the gas pressure in the chamber 17 until the groove 13 no longer by-passes the piston. The resulting pressure in the pumping compartment 18 causes liquid to be driven from the compartment through the bores 22 past the member 23 into the bore 8c and into the storage chamber 25. During rebound movement of the piston 9c, liquid is drawn from the compartment 16 through the bores 10 into the expanding compartment 18, and is expelled therefrom toward the chamber 25 during the next outward movement of the piston 9c. This cycle is repeated until the illustrated relative position of the vessel 3 and the cylinder 1c, and the corresponding position of the suspended vehicle portion are restored.

The damping plate 26 and its valves 26' provide shock absorption in a known manner during all relative movements of the piston 9c and the cylinder 2c.

The feature which mainly distinguishes the suspension element shown in FIGURE 3 from that illustrated in FIGURE 1 is a piston rod 7d fixedly attached to the cup-shaped vessel 3 of the outer shell whose axial bore 8d forms the pumping compartment of the device. The piston 31 which is fixedly attached to the piston rod 7d is equipped with throttling valves 32 which limit axial flow of liquid through the piston 31 between upper and lower compartments of the cavity 16' in the inner cylinder 2, and thereby provide shock absorption. A similar effect is also achieved by a damping plate 26d fixedly mounted near the bottom end of the cylinder 2 substantially as described above with reference to the plate 26.

The annular space between the inner cylinder 2 and the outer cylinder 1d of the suspension element is axially divided by a floating piston 14, and the portion of the annular space below the piston 14 communicates with the bottom end of the cavity 16' through a duct 15. The annular space portion above the piston 14 is connected with a chamber 17 in the vessel 3 by a duct 19 in the top of the cylinder 1d. The chamber 17 and the upper portion of the annular space between the cylinders are filled with a gas whereas the remainder of the apparatus is normally filled with a liquid.

A tubular plunger 27' is fixedly fastened to the damping plate 26d and extends through a central axial bore in the piston 31 into the bore 8d of the piston rod 7d. The upper portion of the plunger 27' is dimensioned sealingly to engage the walls of the bore in the piston 31, but its cross section is smaller than that of the bore 8d. The lower portion of the plunger 27' is slim enough to pass through the bore of the piston 31 with substantial clearance. In the illustrated position of the apparatus, the bore 8d thus is connected with the cavity 16' by an annular passage which extends along the plunger 27'.

The bore of the plunger 27' is downwardly open toward the bottom of the cylinder 2. Its top is normally closed by a check valve 28 which provides the lower abutment for a biasing spring 28' in the bore 8d. The upper abutment 29 of the spring 28' is axially slidable in the bore 8d toward and away from the stem of a spring-loaded check valve 30 which normally closes a duct 6d. The duct 6d passes through a ball-and-socket joint 33 by means of which the vehicle body is normally attached to the piston 7d and the vessel 3 of the suspension element, and leads to a non-illustrated storage vessel for a liquid under pressure as described with reference to FIGURE 1. Another ball-and-socket joint 34 connects the cylinder 1d to the wheels of the vehicle.

The suspension element shown in FIGURE 3 is closely similar to that described with reference to FIGURE 1 except as stated above, and functions in an analogous manner as a spring and as a leveling device.

The apparatus of FIGURE 3 operates as a pneumatic spring and as a shock absorber in a manner obvious from the preceding description of FIGURES 1 and 2 as long as the afore-mentioned annular passage connects the bore 8d with the cavity 16', and the valve 30 is closed. If a heavier load on the connected vehicle body causes the piston rod 7d to move farther inward of the cylinder 1d than during normal spring oscillations, the abutment 29 is pressed against the stem of the valve by the compressed spring 28' with a force sufficient to open the valve and to admit liquid to the cavity 16' from the non-illustrated storage vessel through the duct 6d, thereby compressing the gas in the chamber 17 and the connected annular space between the cylinders 1d, 2 until the piston rod 7d is driven outward of the cylinder 2 by the gas pressure in the chamber 17, and is returned to the illustrated position in which the valve 30 is closed.

When the load on the vehicle is reduced, the gas pressure in the chamber 17, which acts on the cup-shaped vessel 3, causes the piston rod 7d to move outward of the cylinder 2 until its central bore is blocked by the wider top portion of the plunger 27'. During further outward movement of the piston rod 7d, the check valve 28 is opened, and liquid is drawn into the bore 8d. During the rebound of the piston rod 7d, the valve 28 is closed, and liquid is returned under pressure from the bore 8d through the valve 30 and the duct 6d to the non-illustrated storage vessel.

The several embodiments of the invention have been illustrated and described in respective positions in which the cup-shaped vessel 3 is downwardly open and has an upright axis. It will be appreciated that the suspension elements illustrated do not depend on gravity for their operation, and may therefore be oriented in any desired manner.

The suspension elements of the invention occupy relatively little space, mainly because the gas-filled spaces of the elements, which provide the pneumatic spring effect, extend over the entire length of the piston rod in all operative positions of the device. The working parts of the suspension element extend over the entire distance between the attachments 1a, 1b or the corresponding ball-and-socket joints 33, 34 and occupy a space whose cross section is practically uniform over this distance.

The operating pressure required for supporting a vehicle load is relatively small because the internal pressure is applied to areas larger than in similar known devices of corresponding capacity.

The devices of the invention do not require packings for sealing a chamber within the suspension elements from the ambient atmosphere where a piston rod or the like moves inward and outward of a cyliendr structure. The suspension elements of the invention can therefore be constructed in a relatively simple and inexpensive manner without compromising their useful life.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A hydropneumatic suspension element comprising, in combination:
   (a) a cup-shaped vessel member having an axis and defining a chamber open in one axial direction;
   (b) an outer cylinder member partly received in said vessel member for telescoping axial movement relative to said vessel member inward and outward of said chamber;
   (c) a diaphragm member of flexible material interposed between said members, said diaphragm member and said cylinder member substantially closing said chamber in said one axial direction;
   (d) a divider member movably mounted in said cylinder member in sealing engagement with the cylinder member, said divider member separating two spaces in said cylinder member from each other, one of said spaces communicating with said chamber;
   (e) a piston assembly fixedly fastened to said vessel member and extending therefrom inward of said cylinder member;
   (f) means in said outer cylinder member defining an inner cylinder, a portion of said piston assembly being received in said inner cylinder for axial movement relative thereto when said vessel member and outer cylinder member move axially relative to each other, said portion of said piston assembly bounding a portion of said inner cylinder;
   (g) and conduit means connecting said portion of said inner cylinder with the other one of said two spaces.

2. An element as set forth in claim 1, further comprising a first body of fluid substantially filling said chamber and said one space, and another body of fluid substantially filling said other space, said conduit means, and said portion of said inner cylinder.

3. An element as set forth in claim 2, wherein said first body of fluid is a gas, and said second body of fluid is a liquid.

4. An element as set forth in claim 1, wherein said diaphargm member is annular about said axis and radially interposed between respective axially coextensive portions of said outer cylinder member and of said vessel member.

5. An element as set forth in claim 4, wherein said diaphragm member is substantially U-shaped in axial section, said U-shape having two leg portions and a bight portion connecting the leg portions, said leg portions being respectively fixedly fastened to said cylinder member and to said vessel member.

6. An element as set forth in claim 4, wherein said vessel member has an annular rib in said chamber about said axis, said diaphragm member having a rim portion engaging said rib, the element further comprising clamping means pressing said rim portion against the engaged rib.

7. An element as set forth in claim 6, wherein said rib has a substantially conical face about said axis, said face flaring in said one axial direction, and said clamping means including a substantially bell-shaped clamping member coaxially fastened to said piston assembly in said chamber, said clamping member having an annular portion pressing said rim portion against said face.

8. An element as set forth in claim 1, wherein said outer cylinder member and said inner cylinder are substantially coaxial and radially spaced from each other, said divider member being annular and extending between said cylinder member and said inner cylinder to separate said two spaces in an axial direction, said spaces being radially bounded by said cylinder member and said inner cylinder, the element further comprising a source of a fluid under pressure, pump means, and valve means, said valve means and said pump means being operatively interposed between said source and said inner cylinder, said valve means being responsive to movement of said piston assembly in said inner cylinder in one axial direction from a predetermined position over a predetermined distance for connecting said portion of the cylinder to said source for admission of fluid from said source to said cylinder portion, and said pump means being responsive to movement of said piston assembly in the opposite axial direction from said position for pumping the admitted fluid from said cylinder portion to said source.

9. An element as set forth in claim 8, wherein said piston assembly has an axially extending bore, and said pump means include a plunger member axially movable in said bore.

References Cited
UNITED STATES PATENTS 3,000,625    9/1961    Polhemus.
3,046,003    7/1962    Schultz.

ARTHUR L. LA POINT, *Primary Examiner.*
R. M. WOHLFARTH, *Assistant Examiner.*